R. SCHMITZ.
VALVE FOR GAS ENGINES.
APPLICATION FILED AUG. 13, 1913.

1,236,488.

Patented Aug. 14, 1917.
3 SHEETS—SHEET 1.

WITNESSES:
K. Dolbey
C. M. Baumeister

INVENTOR.
Richard Schmitz
BY Harry Lea Dodson
His ATTORNEYS

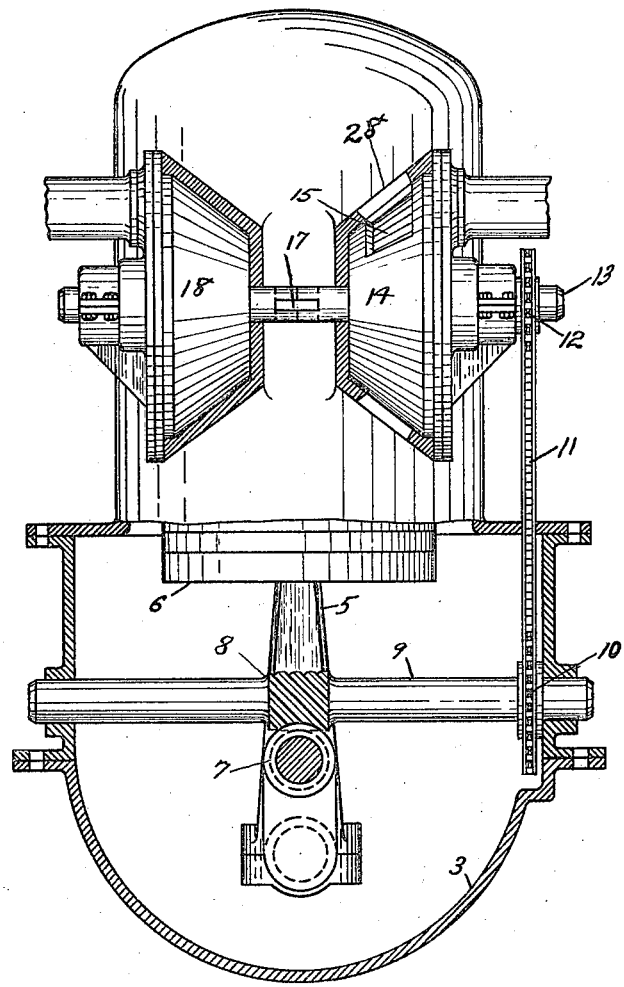

R. SCHMITZ.
VALVE FOR GAS ENGINES.
APPLICATION FILED AUG. 13, 1913.
1,236,488.
Patented Aug. 14, 1917.
3 SHEETS—SHEET 3.
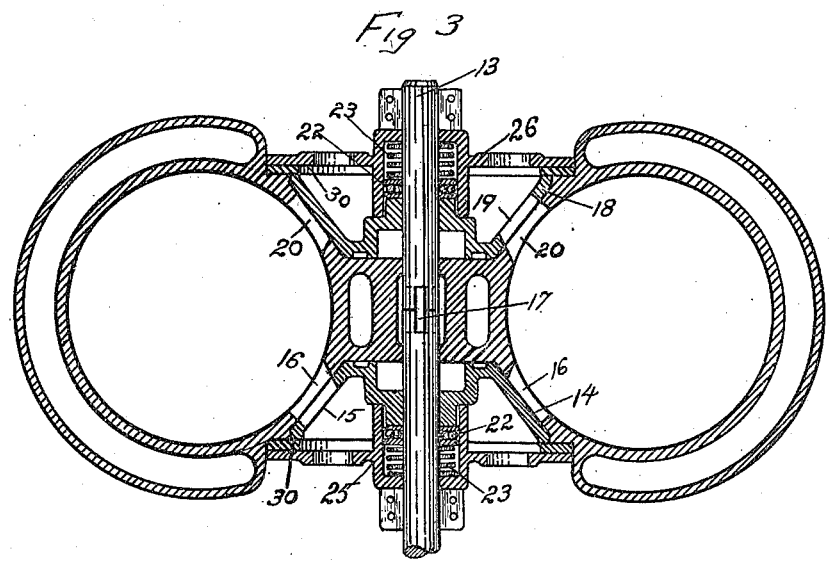
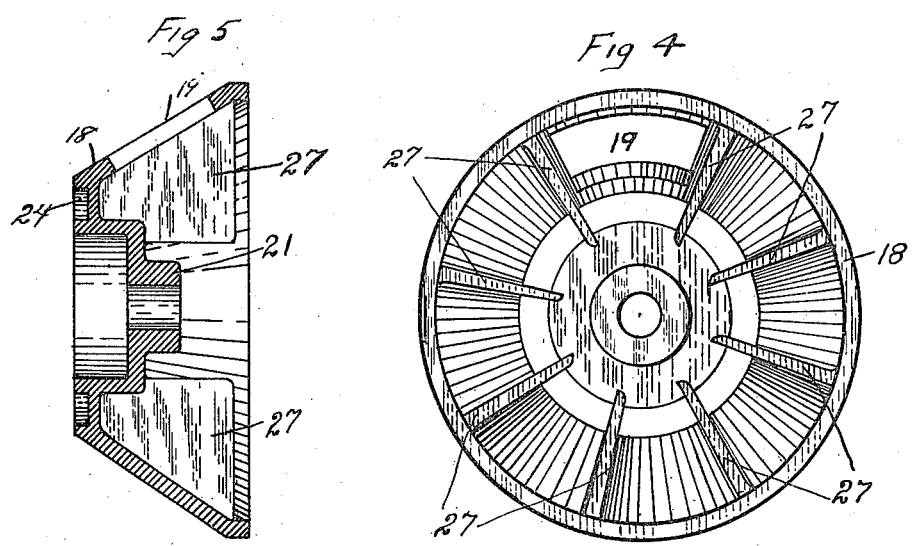
WITNESSES:
INVENTOR.
Richard Schmitz
BY Harry Lea Dodson.
His ATTORNEY.

UNITED STATES PATENT OFFICE.

RICHARD SCHMITZ, OF CHICAGO, ILLINOIS, ASSIGNOR TO SCHMITZ ENGINE COMPANY, A CORPORATION OF SOUTH DAKOTA.

VALVE FOR GAS-ENGINES.

1,236,488.      Specification of Letters Patent.      Patented Aug. 14, 1917.

Application filed August 13, 1913. Serial No. 784,489.

*To all whom it may concern:*

Be it known that I, RICHARD SCHMITZ, a citizen of the United States, residing at Chicago, in the county of Cook and State of Illinois, have invented a certain new and useful Improvement in Valves for Gas-Engines, of which the following is a specification.

My invention relates to that class of engines in which a rotary valve is employed to control the inlet and exhaust ports of the engine, and has for its primary object to provide a valve of such construction as to permit the formation of the ports of the engine in such shape that the piston in its movement will run over the port, entirely closing it, and in this manner absolutely protects the valve from the force of the explosion, thus materially lengthening the life of the valve. This is a feature which is impossible in any engine with which I am familiar, due to the danger of the piston ring engaging the edges of the port, and thereby damaging both the piston and the cylinder, besides providing for the pressure due to compression of the charge being borne by the piston and rings instead of by the valve.

My invention has for its further object to provide a valve which will be self-adjusting, and which will be protected from leakage by oil, and which will be of such construction that should it run dry, it will still continue to operate without lubrication.

My invention has for its further object to provide a construction which will permit of the use of a single valve for two cylinders, and to provide a construction so that the mechanism for operating the inlet valve will operate the exhaust valve; and has for its further object to provide self-cooling means on the exhaust valve, which will also have the effect of materially assisting to exhaust the products of combustion from the interior of the cylinder.

My means of accomplishing the foregoing may be more readily understood by having reference to the accompanying drawings, which are hereunto annexed and are a part of this specification, in which:

Fig. 2 is a vertical sectional view through the center of the valve casing, the valves and driving mechanism being shown in elevation.

Fig. 3 is a cross section taken through the center of the valves.

Fig. 4 is an enlarged detail view of the exhaust valve.

Fig. 5 is a cross section of the same.

Similar reference numerals refer to similar parts throughout the entire description.

Figure 1:
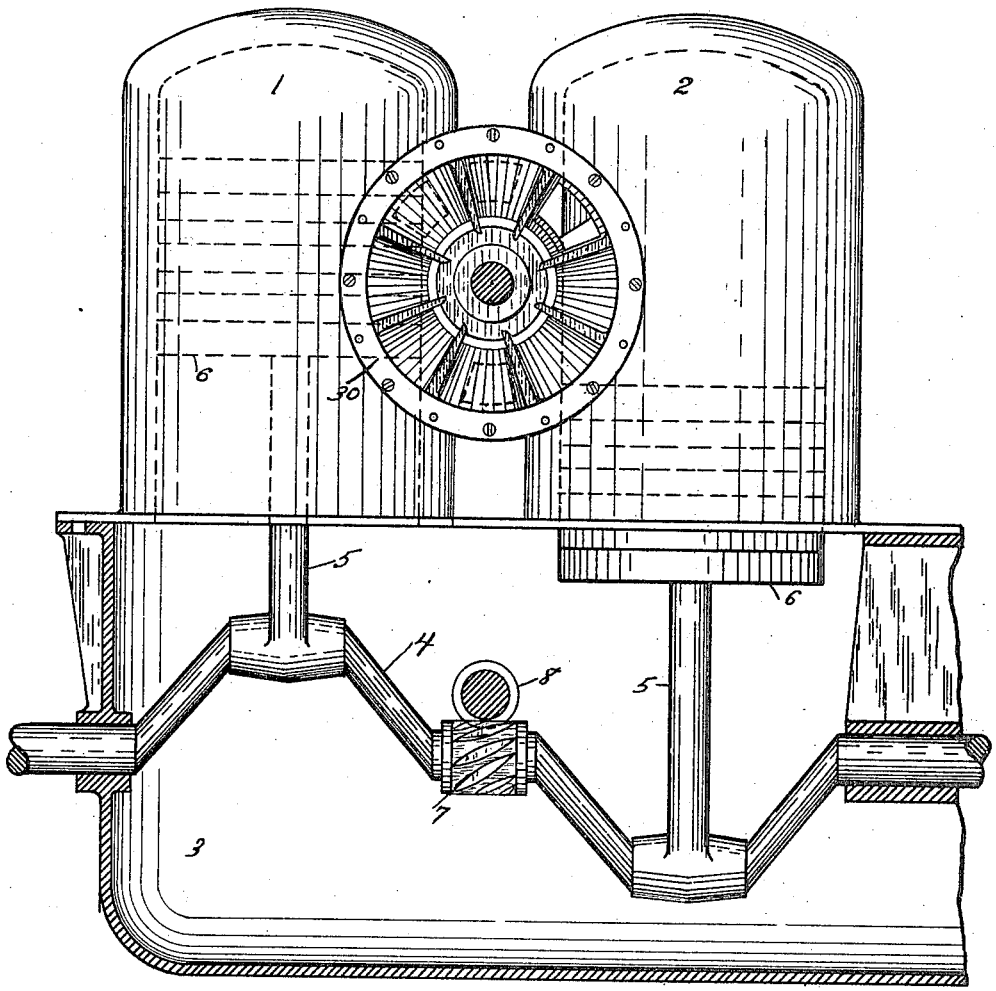
Figure 1 is a side elevation of an engine partially shown in section provided with my improved valve, the view being the exhaust side of the engine, the pressure plate which holds the valve to its seat being removed to show the interior.

As shown in the drawings, the engine is provided with cylinders 1 and 2, and a crank case 3 of the usual construction. 4 indicates the crank, 5 the piston rods and 6 the pistons. 7 is a spiral gear mounted upon the center of the crank shaft and adapted to engage the spiral gear 8, mounted upon a shaft 9 journaled in the side walls of the crank case 3. This shaft carries a sprocket 10, which carries a chain 11 adapted to engage a sprocket 12 mounted upon one end of the valve shaft 13. My improved valves are mounted upon this shaft and are in the shape of a truncated cone, the tapering sides 14 of which form the bearing surface. Ports 15 are cut in these tapering walls and are adapted to register with the ports 16 cut in the side walls of the cylinder. It will be seen from an inspection of the drawings that the shape of these ports 16 is such that at no point does the ring of the piston engage the edges of the ports of the valve.

It will be obvious to persons skilled in the art that the ports 15 will be constructed of the proper area to supply the requisite volume of gas to the engine and to permit the exhaust to escape. 17 indicates a flexible coupling consisting of a cross mounted in the center of the shaft 13. This permits the removal of either the exhaust or inlet valve without disturbing the other valve. 18 is the exhaust valve which is mounted upon the opposite end of the valve shaft 13, and on the opposite sides of the cylinders. It is provided with a port 19 adapted to register with exhaust ports 20 in the engine cylinder. As more clearly seen in the detail view, the valve is of hollow construction, provided with a central hub 21, the end of which is adapted to engage a ball bearing 22 to take up whatever end thrust there may be upon the valve.

A coil spring 23 is adapted to hold the valve to its seat. I provide an oil pocket or seal by forming an annular groove 24 on the lower or inner face of the valve. This annular recess is designed to be filled with oil and affords a very effective seal to prevent the leakage of gas around the inner end of the valve. It will be apparent from an inspection of Fig. 3 that as the valve wears, the spring 23 will serve to hold it to its seat, so that it will take up all of the valve wear and keep tight as long as the valve lasts, and inasmuch as the pistons 6 protect the wall of the valve from contact with the explosion, this deterioration will be so slight as to scarcely amount to anything.

The valves are held to their seats by means of rings 30, which are held down by the pressure plates 25 and 26, which operate to hold the inlet and exhaust valves, respectively, in position.

The exhaust valve as shown in Fig. 5, is provided with a plurality of fins 27, which are constructed like the veins of a fan or pump with the result that they both serve to make the valve self-cooling, and that they also serve to create a partial vacuum, which materially assists in exhausting the products of combustion from the engine cylinder.

The cylinders are provided with water jackets of the usual construction, and the valves are recessed intermediate the two adjacent cylinders, a portion of the wall of each cylinders being utilized, forming the valve seat.

While I have described a specific form for driving the valves, it will be obvious that many other forms may be utilized for this purpose, and I do not wish to be understood as limiting myself to the precise means shown in the drawings.

Having described my invention, what I regard as new and desire to secure by Letters Patent is:

1. A valve for gas engines, said valve being mounted between adjacent cylinders, said valve being of truncated cone shape and having ports in the tapering wall, said cylinder having correspondingly shaped ports, said last named ports being so disposed within the cylinder that the piston can run over them, whereby the valve is protected from the force of the explosion and compression.

2. A gas engine having a rotary valve of truncated cone shape mounted intermediate adjacent cylinders, said valves having ports in the tapering walls thereof and corresponding ports in the cylinder of the engine, said ports being so disposed within the cylinder that the piston can run over them, whereby the valve is protected from the force of the explosion and compression, and means actuated by the crank shaft to rotate said valves.

3. A gas engine having a rotary valve of truncated cone shape mounted intermediate adjacent cylinders, said valves having ports in the tapering walls thereof and corresponding ports in the cylinder of the engine, said ports being so disposed within the cylinder that the piston can run over them, whereby the valve is protected from the force of the explosion and compression, means actuated by the crank shaft to rotate said valves, an exhaust valve on the opposite side of said cylinder, a shaft upon which said valves are mounted and means to rotate said shaft.

4. A gas engine having a rotary valve of truncated cone shape mounted intermediate adjacent cylinders, said valves having ports in the tapering walls thereof and corresponding ports in the cylinder of the engine, said ports being so disposed within the cylinder that the piston can run over them, whereby the valve is protected from the force of the explosion and compression, means actuated by the crank shaft to rotate said valves, and means to hold said valves to their seats.

5. A gas engine having a rotary valve of truncated cone shape mounted intermediate adjacent cylinders, said valves having ports in the tapering walls thereof and corresponding ports in the cylinders of the engine, said ports being so disposed within the cylinder that the piston can run over them, whereby the valve is protected from the force of the explosion and compression, means actuated by the crank shaft to rotate said valves, an exhaust valve on the opposite side of said cylinder, a shaft upon which said valves are mounted, means to rotate said shaft, each of said valves having an annular chamber adapted to contain oil and located on its inner face.

6. A gas engine having a rotary valve of truncated cone shape mounted intermediate adjacent cylinders, said valves having ports in the tapering walls thereof and corresponding ports in the cylinder of the engine, said ports being so disposed within the cylinder that the piston can run over them, whereby the valve is protected from the force of the explosion and compression, means actuated by the crank shaft to rotate said valves, an exhaust valve on the opposite side of said cylinder, a shaft upon which said valves are mounted, means to rotate said shaft.

7. A gas engine having a rotary valve of truncated cone shape mounted intermediate adjacent cylinders, said valves having ports in the tapering walls thereof and corresponding ports in the cylinder of the engine, said ports being so disposed within the cylinder that the piston can run over them, whereby the valve is protected from the force of the explosion and compression, means actuated by the crank shaft to rotate said valves, an exhaust valve on the opposite side of said cylinder, a shaft upon which said valves are mounted, means to rotate said shaft, said shaft being formed in two pieces, and means to yieldingly hold said two pieces together.

8. A gas engine having rotary valves of truncated cone shape mounted intermediate adjacent cylinders, said valves having ports in the tapering walls thereof and corresponding ports in the cylinders, means to protect the said valves from the force of the explosion and compression.

9. A gas engine having rotary inlet and exhaust valves mounted intermediate adjacent cylinders and on opposite sides, said valves having ports in the tapering walls thereof and corresponding ports in the cylinders, means to protect the said valves from the force of the explosion and compression, means formed in the said exhaust valve to assist in exhausting the products of combustion.

10. A gas engine having rotary inlet and exhaust valves mounted intermediate adjacent cylinders and on opposite sides, said valves having ports in the tapering walls thereof and corresponding ports in the cylinders, means to protect the said valves from the force of the explosion and compression, a plurality of fan blades cast or formed on the said exhaust valve.

In witness whereof I have signed the foregoing specification.

RICHARD SCHMITZ.

Witnesses:
K. DOLBEY,
C. M. BAUMEISTER.

Copies of this patent may be obtained for five cents each, by addressing the "Commissioner of Patents, Washington, D. C."